March 24, 1970 — H. W. STANHOPE — 3,502,524

PROCESS OF MAKING FIRE HOSE AND THE LIKE

Original Filed April 24, 1964 — 2 Sheets-Sheet 1

INVENTOR
HARRY W. STANHOPE
BY
ATTORNEYS

March 24, 1970  H. W. STANHOPE  3,502,524
PROCESS OF MAKING FIRE HOSE AND THE LIKE
Original Filed April 24, 1964  2 Sheets-Sheet 2
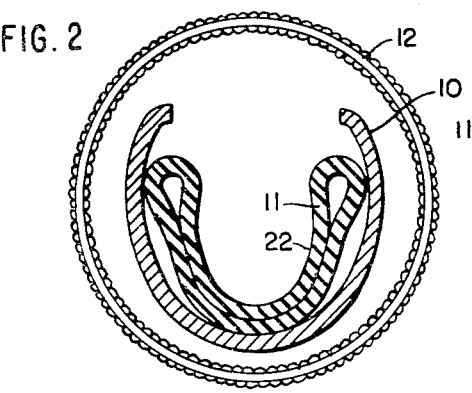
FIG. 2
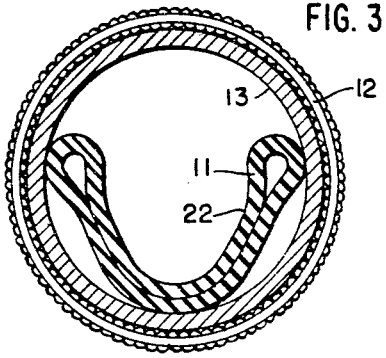
FIG. 3
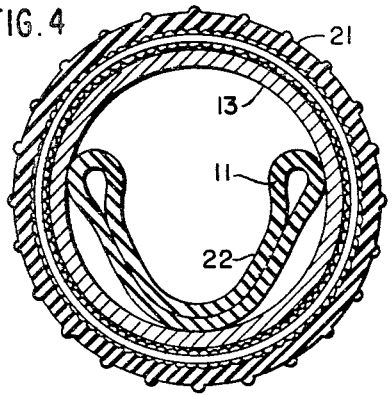
FIG. 4
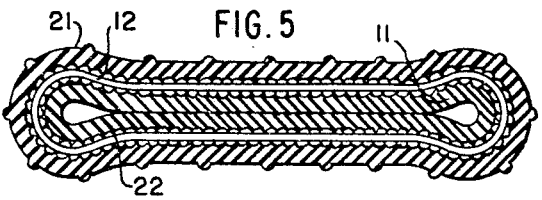
FIG. 5
FIG. 6
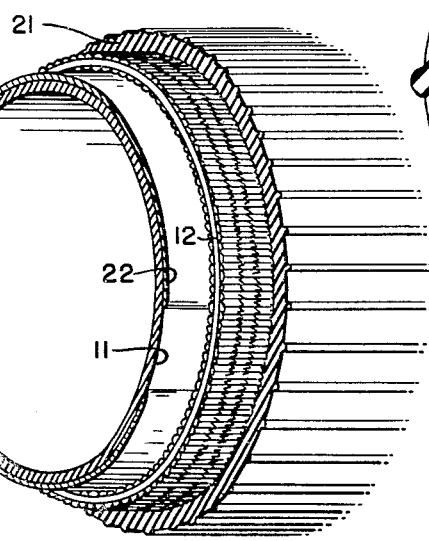
FIG. 7
INVENTOR
HARRY W. STANHOPE
BY
*Kenway, Jenney & Hildreth*
ATTORNEYS United States Patent Office 3,502,524
Patented Mar. 24, 1970

3,502,524
PROCESS OF MAKING FIRE HOSE
AND THE LIKE
Harry W. Stanhope, Hohenwald, Tenn., assignor to American Biltrite Rubber Co., Inc., Chelsea, Mass., a corporation of Delaware
Original application Apr. 24, 1964, Ser. No. 362,280. Divided and this application July 27, 1966, Ser. No. 568,154
Int. Cl. B32b 1/08, 25/04, 31/16
U.S. Cl. 156—84                                5 Claims

ABSTRACT OF THE DISCLOSURE

A process of making fire hose and the like characterized by the employment of a mandrel having its upper side cut away in a wide longitudinal zone of sufficient area to admit freely a straight length of rubber hose, supplemented by the cooperative employment of a closed sizing mandrel upon which the rubber tube is assembled within a preformed fabric tube.

Figure 1:
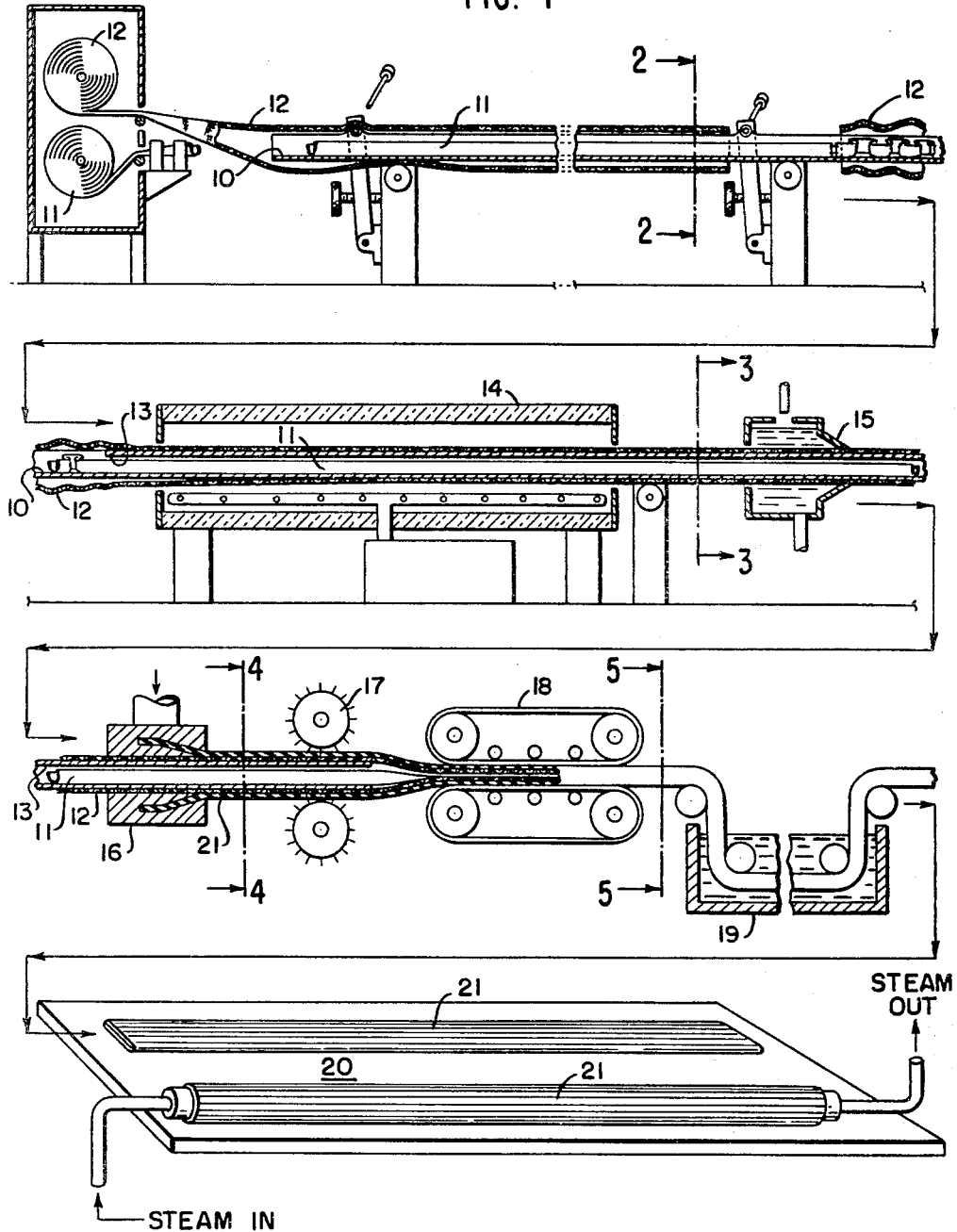

This application is a division of my copending application Ser. No. 362,280, filed Apr. 24, 1964, now abandoned.

This invention comprises a new and improved process of making flexible, light weight hose such as fire hose or the like and includes within its scope hose of novel construction so produced.

Fire hose as heretofore constructed has included a reinforcing tube of relatively heavy canvas which is not only expensive but makes the hose stiff and inconvenient to handle in use.

I have discovered that a much lighter weight and more flexible hose may be constructed by employing, instead of heavy canvas, polyester or other synthetic and thermoplastic fiber having high tensile strength and inherent flexibility. A seamless reinforcing tube of such fabric may be first woven and shrunk upon a sizing mandrel and then while supported internally upon its mandrel be provided by extrusion with an outer cover ply of rubber.

The hose may be provided with an inner lining ply of rubber by introducing a semi-cured rubber tube in collapsed condition into the fabric reinforcing tube and for this purpose I employ an open-sided mandrel in which it is convenient to lay the semi-cured rubber tube. The two tubes may then be introduced into a sizing mandrel of closed formation with the fabric reinforcing tube passing outside and enclosing the semi-cured rubber tube which is now located inside the mandrel. The fabric reinforcing tube may now be shrunk to its final size on the sizing mandrel and an outer cover ply of rubber may be formed by extrusion molding while the tube is thus supported. Up to this stage the semi-cured rubber inner tube remains quiescent and in collapsed condition within the now shrunken and covered fabric tube. The fabric and rubber tube are then drawn off the end of the sizing mandrel in preparation for the next step of the process.

As herein shown the inner rubber tube may now be inflated and bonded to the inner surface of the fabric tube. If the inner tube is bonded to the fabric tube only in spaced non-continuous areas, as for example, in spaced longitudinal stripes, it is found that this discontinuous bonding tends greatly to enhance the flexibility of the resulting hose.

In carrying out the process of this invention the assembled reinforcing and rubber tube are withdrawn from the sizing mandrel in flattened condition, then fluid pressure is admitted to the semi-cured inner tube so that the latter is forced into intimate contact with the inner surface of the fabric reinforcing tube. Vulcanization or curing is then carried out under conditions of heat and substantial internal pressure. At this stage of the process discontinuous areas of the rubber inner tube which may have been coated with uncured rubber are effective to produce the desired non-continuous bonding to the fiber tube.

These and other features of the invention will be best understood and appreciated from the following description of a preferred manner of carrying out the process and apparatus selected for purposes of illustration and shown in the accompanying drawings in which—

FIG. 1 is a diagrammatic view showing the apparatus in four related sections,

FIGS. 2, 3, 4 and 5 are sectional views on an enlarged scale on the lines 2—2, 3—3, 4—4 and 5—5 respectively, FIG. 6 is a fragmentary view of the hose in cross section on a greatly enlarged scale, and FIG. 7 is a fragmentary view in perspective showing an end portion of the hose.

The process of my invention is herein described as carried out in producing fire hose such as that shown in FIGS. 6 and 7, although it will be understood that hose for general or special purposes may be produced by substantially the same process.

The hose herein shown comprises in its structure a seamless fabric reinforcing tube 12 of woven "Dacron," "Orlon," nylon or other synthetic polyester of high tensile strength. Externally the fabric tube is provided with an extruded outer cover ply 21 of natural or synthetic rubber or a compound thereof and if desired this may have a thin outer coating of thermoplastic resin.

Internally the hose has a lining or inner rubber tube 11 which is bonded to the fabric tube 12 in spaced parallel bands where it has been provided with stripes 22 of uncured rubber for that purpose. Otherwise the rubber tube 11 is free of connection with the fabric tube 12.

In the first step of the process there is employed a mandrel 10 of open side cross section such as shown in FIG. 2, that is to say, the upper side of the mandrel is cut away in a wide longitudinal zone of sufficient area freely to admit a straight length of preformed rubber tube 11. This mandrel is supported at convenient height and in it is placed a tube 11 of semi-cured rubber having a pair of wide spaced longitudinal stripes 22. These stripes of uncured rubber later supply the medium for bonding to the reinforcing tube. The rubber tube may be drawn from a reel in convenient lengths, for example, from 75 to 100 feet. The fabric reinforcing tube 12 may also be drawn from a reel as suggested and slipped over the outer surface of the mandrel 10 thus enclosing the rubber tube 11 where it lies in collapsed condition in the mandrel.

The open sided mandrel 10 is arranged in alignment with the sizing mandrel 13 circular in cross section as shown in FIGS. 3 and 4, and arranged to receive internally the rubber tube 11, still in its collapsed condition, and also to receive externally the fabric reinforcing tube 12. As suggested in the first section of FIG. 1 the reinforcing tube may be accordian pleated on the mandrel 13 to provide an accumulation of length at that point may be used up at a convenient rate as the process is continued.

While supported upon the closed sizing mandrel 13 the fabric reinforcing tube 12 is passed to an oven 14 wherein it is subjected to sufficient heat to shrink it upon the mandrel thus determining its finished diameter and when "Dacron" is employed a temperature of 200 to 300° F. is adequate for this step of the process.

After passing the oven 14 and while still supported by the mandrel 13 a thin coating of rubber cement is applied to the outer surface of the fabric tube as by passing it through a cement tank 15 shown in the second section of FIG. 1.

The shrunken and cement-coated tube 12, still supported by the sizing mandrel 13, is next passed through an extruding die 16 wherein a relatively thick outer ply of rubber 21 or other elastomeric compound is applied to its outer surface. In this step any desired surface pattern such as the longitudinal ribs shown in FIG. 7 may be molded upon the outer ply 21.

After passing the extruding die 16 the partially formed hose while still upon the sizing mandrel 13 is passed between a pair of pricker rolls 17. These form escape passages for any air that may be trapped between the rubber cover ply and the reinforcing fabric ply. The pricker holes allow any trapped air to escape when the tube is inflated in the final step of the process. If the pricker holes are not formed the rubber cover ply tends to be forced by the trapped air away from the fabric tube.

The partially formed hose is now drawn off the end of the sizing mandrel 13 by a pair of driven traction belts 18 which compress the two tubes to a flattened condition as shown in FIG. 7. It will be understood that the rubber tube 11 has remained in its collapsed condition up to and through this stage of the process.

Upon leaving the traction feed belts the flattened hose is passed through a tank 19 containing a cooling fluid which is useful in stiffening the uncured rubber tube if that is found to be desirable. This step is of secondary importance and may be included or not in the process depending upon the texture of the rubber tube at this stage. Alternatively the die 16 may be used to apply a thin wear-resisting cover of thermoplastic compound to the outside of the hose.

Upon leaving the tank 19 the hose in flattened condition is placed upon a vulcanizing or curing table 20 and steam at a temperature of about 275° F. and corresponding pressure is admitted to the inner rubber tube 11, inflating the tube and forcing it into intimate contact with the inner surface of the fabric reinforcing tube and also causing the rubber stripes 22 carried by this tube to make bonding contact with the fabric reinforcing tube 12. At this stage also all the elastomeric elements of the hose are fully vulcanized or cured.

Having thus disclosed my invention what I claim as new and desire to secure by Letters Patent is:

1. The process of making hose comprising the following steps:
    (1) laying a straight length of semi-cured rubber tube in collapsed condition in an elongated open-side mandrel,
    (2) feeding a reinforcing tube of synthetic fabric upon the mandrel and enclosing the collapsed rubber tube within said mandrel,
    (3) advancing the assembled fabric tube upon a second mandrel and the collapsed rubber tube into said second mandrel which is complete in circular cross section,
    (4) shrinking said fabric tube to its final size upon the outer surface of the said second mandrel,
    (5) coating the outer surface of said fabric tube with cement,
    (6) extruding an outer cover ply of rubber upon the cement-coated fabric tube,
    (7) forming spaced perforations in said outer cover ply of rubber,
    (8) drawing the assembled tubes from the said second mandrel and flattening them by external pressure,
    (9) applying a coating of thermoplastic resin to the outer rubber cover, and
    (10) inflating and curing the rubber inner tube and bonding it to the fabric tube by the application of heat and internal fluid pressure.

2. The process of making hose as defined in claim 1, further characterized in that the inner rubber tube has in its outer surface spaced areas of uncured rubber through the medium of which it is bonded to the inner surface of the fabric reinforcing tube.

3. The process of making hose characterized by the steps of assembling in an open-side mandrel a straight length of semi-cured rubber tube in collapsed condition, drawing a fabric tube upon the open sided mandrel and enclosing the rubber tube therein, then advancing the two tubes to a closed sizing mandrel passing the collapsed rubber tube inside said second mandrel, shrinking said fabric upon said second mandrel, removing the tubes from the said second mandrel, and then inflating and curing said semi-cured rubber tube.

4. The process of making hose as defined in claim 3, further characterized by the steps of assembling a rubber covered reinforcing tube of fabric upon the outer surface of a second mandrel with the semi-cured rubber tube disposed within said second mandrel, shrinking said fabric tube to its finished size, drawing the assembled tubes in flattened condition from said second mandrel, inflating the tubes, and curing under conditions of heat and internal fluid pressure.

5. The process of making hose as defined in claim 3, further characterized by the steps of enclosing a semi-cured tube of rubber in collapsed condition within a said second mandrel, shrinking a seamless reinforcing tube of synthetic polyester upon the outer surface of the mandrel, withdrawing both tubes together from the mandrel and inflating the rubber tube with steam.

References Cited

UNITED STATES PATENTS

| | | | |
|---|---|---|---|
| 28,389 | 5/1860 | Mayall | 156—294 |
| 2,392,967 | 1/1946 | Balkin | 156—294 |
| 2,855,975 | 10/1958 | Ritchie et al. | 156—244 |
| 2,988,130 | 6/1961 | Rittenhouse | 156—86 |
| 3,018,755 | 1/1962 | Metcalf. | |
| 3,018,800 | 1/1962 | Hanssens | 156—294 |
| 3,045,281 | 7/1962 | Skobel. | |

FOREIGN PATENTS

| | | |
|---|---|---|
| 71,220 | 12/1893 | Germany. |
| 836,879 | 7/1960 | Great Britain. |

JOHN T. GOOLKASIAN, Primary Examiner

W. E. HOAG, Assistant Examiner

U.S. Cl. X.R.

156—87, 244, 252, 290, 294